(No Model.)

T. H. WALTON.
MINING DRILL.

No. 333,798. Patented Jan. 5, 1886.

WITNESSES
J. Walter Douglass
Thos. M. Smith.

INVENTOR
Thomas H. Walton
By J. C. Sibley
Attorney

UNITED STATES PATENT OFFICE.

THOMAS H. WALTON, OF ASHLAND, ASSIGNOR OF ONE-HALF TO J. WARREN COULSTON, OF PHILADELPHIA, PENNSYLVANIA.

MINING-DRILL.

SPECIFICATION forming part of Letters Patent No. 333,798, dated January 5, 1886.

Application filed July 21, 1884. Serial No. 138,316. (No model.)

*To all whom it may concern:*

Be it known that I, THOMAS HUNTER WALTON, of Ashland, in the county of Schuylkill and State of Pennsylvania, have invented certain new and useful improvements in drills for use in rock, slate, coal, and like substances by which the effectiveness of the drill is largely increased; and I do hereby declare that the following is a full, clear, and exact description of the invention, which will enable those skilled in the art of making tools and drills to manufacture it, and those skilled in the use of other drills to apply my invention in the performance of that class of work done by other rock-drills.

Figure 1:
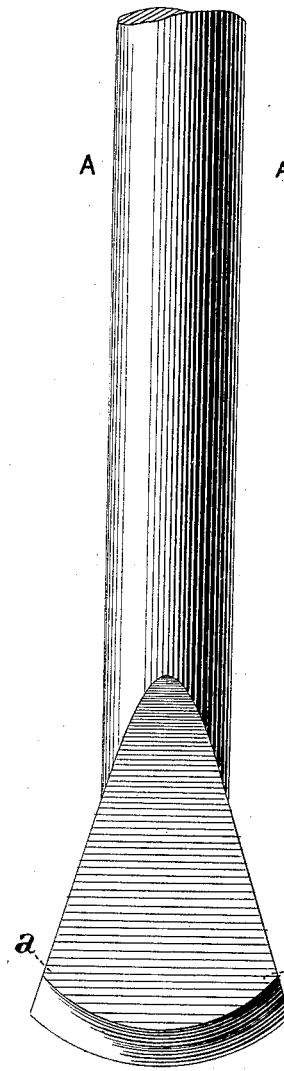
Figure 2:
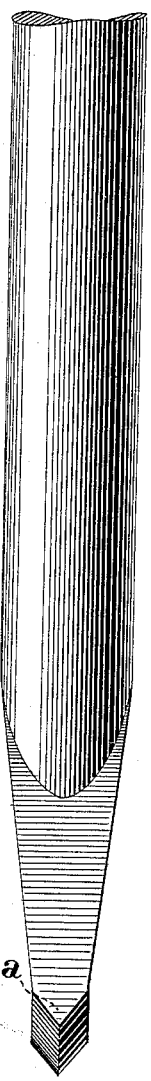
Figure 3:
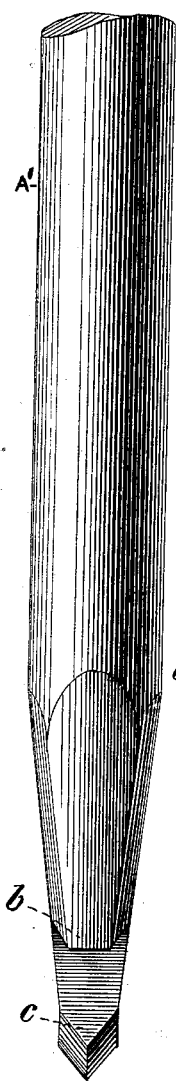
Figure 4:
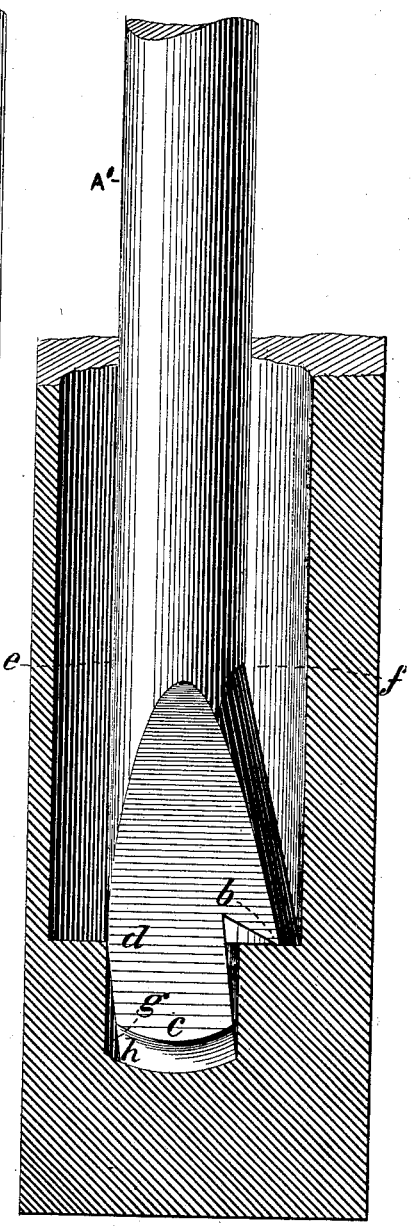

At the present time the drill most commonly used in the mine, quarry, and ordinary blasting operations is that possessing the chisel-shaped cutting-edge represented by Figures 1 and 2 of the accompanying drawings. Figs. 3 and 4 represent, respectively, views of my improved drill from points at right angles to one another.

In order to better understand the improvements existing in my drill, it is necessary to point out certain bad features which exist in the common rock-drill referred to.

One bad feature of the common chisel-drill is its tendency to stick fast when driven home. In consequence of this much useless force is employed to draw the drill and turn it to another position. Again, after a common drill has been in use a short time the corners denoted *a a* wear off to such an extent as to require the substitution of a new cutter in order to preserve the original gage of hole. In deep priming-holes the hole is alternately drilled and reamed out by a reamer to maintain an even diameter of bore.

Another serious objection to the common drill is its inability to drill a reasonably-straight hole through a bed of conglomerate rock or through any substance not having a homogeneous composition. When a hard substance is encountered upon one side of the hole, it causes the drill to glance off and cut into the opposite side. A cavity on one side of a hole through hard rock produces a similar effect. So, also, a softer substance met with in drilling has a tendency to throw a bore-hole out of line.

My invention consists in the use of what I term a "heel" upon one end of the chisel-edge, and a projecting supplemental cutter adjacent to, but above, the other end of said edge.

The shank A' of the drill is of the ordinary construction, and terminates in a chisel-edge, C; but instead of projecting uniformly on each side of the axis of the shank the edge C is cut away at one side, forming a flat beveled surface which extends from the point *h* to the blunt heel *d*, where it merges into the round surface of the drill-shank. Upon the side opposite to the heel *d* is the supplemental cutter *b*, shaped somewhat like a gouge, and projecting laterally beyond the extreme limit of the chisel-edge C. This supplemental cutter I term the "reamer."

The operation of my improved drill is as follows: The chisel-cutter C advances the hole to a depth about equal to the width of the chisel, whereupon the reamer chops off the sides of the hole and finishes it to the diameter required, the drill being after each blow turned around sufficiently to operate on a different side of the hole in a manner similar to that when the ordinary chisel-drill is used.

The use of the heel, which I consider one of the main features of my drill, is to support the reamer by bearing on the side of the advanced part of the drill-hole, being forced to cut the hole out on the side opposite to the heel, as the latter is too blunt to penetrate the rock. The diameter of the drill-hole will be the width of the chisel plus twice the amount of projection of the reamer.

To increase the size of a drill-hole at its lower extremity in order to form a chamber for the reception of an explosive charge, a second drill is inserted, whose gage from the extreme point of the reamer *b* to the heel *d* is the full diameter of the hole *e f*.

By operating such an enlarged drill in the usual manner the area of a drill-hole may be greatly increased below the surface.

This feature of the drill just described presents an advantage in the blasting of hard rock which cannot be overestimated, and as this can be accomplished by the use of two drills having a difference in their gages any miner may double the effects of his blasts, saving largely thereby in the items of labor and material.

In large drills more than one supplemental cutter may be used as a reamer, and the form, proportions, and angles of both chisel and reamer may be greatly varied, provided the heel be used as a support on one side.

Having thus described the nature and objects of my invention, what I claim as new, and desire to secure by Letters Patent, is—

The hereinbefore-described drill having a sharp bottom edge, C, inclined heel $g$, and projecting cutter $b$, arranged above the edge C upon the side opposite to said heel, substantially as set forth.

THOS. H. WALTON.

Witnesses:
WM. H. MYERS,
J. W. DOUGLASS.